United States Patent
Kirsch et al.

(10) Patent No.: US 7,903,862 B2
(45) Date of Patent: Mar. 8, 2011

(54) METHOD FOR DETECTING GEOMETRICAL STRUCTURES IN IMAGES

(75) Inventors: Achim Kirsch, Hamburg (DE); Fritz Jetzek, Hamburg (DE)

(73) Assignee: Evotec Technologies GmbH (DE)

( * ) Notice: Subject to any disclaimer, the term of this patent is extended or adjusted under 35 U.S.C. 154(b) by 929 days.

(21) Appl. No.: 11/631,991

(22) PCT Filed: Jul. 8, 2005

(86) PCT No.: PCT/EP2005/053275
§ 371 (c)(1),
(2), (4) Date: Jun. 21, 2007

(87) PCT Pub. No.: WO2006/005728
PCT Pub. Date: Jan. 19, 2006

(65) Prior Publication Data
US 2007/0263917 A1    Nov. 15, 2007

(30) Foreign Application Priority Data
Jul. 10, 2004   (EP) .................................... 04016307

(51) Int. Cl.
G06K 9/00 (2006.01)
G06K 9/48 (2006.01)
(52) U.S. Cl. ........................ 382/133; 382/199
(58) Field of Classification Search .................. 382/119, 382/123, 128, 129, 130, 131, 132, 133, 134, 382/169, 199, 256, 277; 600/407, 410, 425, 600/427; 128/920, 922
See application file for complete search history.

(56) References Cited

U.S. PATENT DOCUMENTS

| | | | | |
|---|---|---|---|---|
| 6,675,040 | B1 * | 1/2004 | Cosman | 600/427 |
| 7,215,802 | B2 * | 5/2007 | Klingensmith et al. | 382/128 |
| 2002/0012466 | A1 | 1/2002 | DeLong | 382/224 |

OTHER PUBLICATIONS

Zimmermann et al. "*Mammalian cell traces—morphology, molecular composition, artificial guidance and biotechnological relevance as a new type of bionanotube,*" Applied Physics A 73, pp. 11-26.
Leavers, V.F. "*Survey: Which Hough Transform?*" CVGIP: Image Understanding, vol. 58, No. 2, Sep. 1993, pp. 250-264.
Murakami et al. "*High-Speed Line Detection Method Using Hough Transform in Local Area,*" Systems and Computers in Japan, vol. 32, No. 10, 2001, pp. 22-30.
Leavers, V.F. "*The Dynamic Generalized Hough Transform,*" Curves and Surfaces in Computer Vision and Graphics, SPIE vol. 1251, 1990, pp. 281-292.
Shpilman et al. "*Fast and robust techniques for detecting straight line segments using local models,*" Pattern Recognition Letters 20, Elsevier Science B.V., 1999, pp. 865-877.

(Continued)

*Primary Examiner* — Abolfazl Tabatabai
(74) *Attorney, Agent, or Firm* — Ohlandt, Greeley, Ruggiero & Perle, LLP

(57) ABSTRACT

A method for detecting geometrical structures in images, especially in images of chemical and/or biological samples, such as images of cells, the method comprising the following steps: detecting a boundary line of the image object; defining at least one sector inside the image, the origin ($p_k$) of which lies on the boundary line; transforming the image section defined by the sector into a transformation space by means of a transformation that associates signatures in the transformation space with respective geometrical structures in the image section; determining the presence of at least one signature inside the transformation space; and retransforming the signatures from the transformation space into the sector for the representation of the geometrical structure.

14 Claims, 3 Drawing Sheets

OTHER PUBLICATIONS

Lyazghi et al. "*Characterization of Actin Filaments in Cancer Cells by the Hough Transform*," Signal Processing, Pattern Recognition & Applications, Jul. 3-6, 2001, pp. 138-142.

Utcke, Sven. "*Error-Bounds on Curvature Estimation*," Hamburg University, http://kogs-www.informatik.uni-hamburg.de/~Utcke. pp. 1-9.

Mokhtarian et al. "*A Theory of Multiscale, Curvature-Based Shape Representation for Planar Curves*," IEEE Transactions on Pattern Analysis and Machine Intelligence, vol. 14, No. 8, Aug. 1992, pp. 789-805.

Huttonlocher et al. "*Comparing Images Using the Hausdorff Distance*," IEEE Transactions on Pattern Analysis and Machine Intelligence, vol. 15, No. 9, Sep. 1993, pp. 850-863.

Leavers, V.F.; "*Survey Which Hough Transform?*"; CVGIP Image Understanding, Bd. 58, Nr. 2, Sep. 1, 1993, pp. 250-264.

Leavers, V.F.; *The Dynamic Generalized Hough Transform*; Ccurves and Surfaces in Computer Vision and Graphics, Bd. 1251, Feb. 13, 1990, pp. 281-292.

Shpilman, et al.; "*Fast and Robust Techniques for Detecting Straight Line Segments Using Local Models*", Pattern Recognition Letters, Bd. 20, Nr. 9, Sep. 20, 1999. pp. 865-877.

International Search Report dated Jan. 11, 2006 from PCT/EP2005/053275.

\* cited by examiner

METHOD FOR DETECTING GEOMETRICAL STRUCTURES IN IMAGES

BACKGROUND

1. Field of the Invention

The present disclosure refers to a method for detecting geometrical structures in images, in particular in images of chemical and/or biological samples, such as images of cells. Specifically, the present disclosure refers to a method for detecting cell traces.

2. Discussion of the Background Art

Cell traces are understood as straight objects originating from the borders of cells. They vary in width and length and include varying angles with the cell surface. This phenomenon is described in detail in ZIMMERMANN, H., E. RICHTER, C. REICHLE, L WESTPHAL, P. GEGGIER, U. REHN, S. ROGASCHEWSKI, W. BLEISS and G. R. FUHR: *Mammalian Cell Traces-Morphology, Molecular Composition, Artificial Guidance and Biotechnological Relevance as a New Type of "Bionanotube"*, Appl. Phys. A., May 2001.

For a detection of linear objects in image analysis, the linear Hough transformation has prevailed. It is described in LEAVERS, V. F.: *Which Hough Transform. CVGIP: Image Understanding*, 58(2):250-264, 1993. Here, the image is transformed from a real space into a Hough space whose dimensions are defined by line parameters. The problem of line detection is thus transformed into a problem of filtering maximum values from a transformed. The method in turn is a special case of general Hough transformation as described, for example, in U.S. Pat. No. 3,069,654.

Starting from the original linear transformation, various improvements were proposed.

Generally, a global transformation of an image is not useful, since the lines to be detected often appear only in a part of the image; as soon as coarser structures (e.g. large surfaces) are present in other parts of the image, the lines can no longer be unambiguously identified from the transformed.

For example, US 2002/0012466 A1 describes one possibility of restricting the real space to be transformed. Herein, a user is frequently given the opportunity during the analysis to manually limit the region. The process is ended interactively, as soon as the quality of the transform meets with the demands of the user.

Despite a locally limited treatment of the real space, maxima may be produced in the transformed space that correspond to no object actually present in the real space. This phenomenon occurs, for example, if the intensities "incidentally" detected during the transformation of a point are higher than those actually associated with the object ("correlated noise", Leavers, see above).

Murakami, in MURAKAMI, K. and T. NARUSE: *High-Speed Line Detection Method Using Hough Transform in Local Area. Systems and Computers in Japan*, 32(10): 918-926, 2001, proposes an approach for reducing this effect, wherein only a respective section of the real space is transformed; lines that extend beyond an observed section, however, have to be correlated with other sections in an additional step.

In *The Dynamic Generalized Hough Transform*. in: *Curves and Surfaces in Computer Vision and Graphics*, vol. 1251, p. 281-292, SPIE, August 1990, Leavers describes an approach to a solution, wherein the transformation is first performed only for one point; the Hough space forming has one dimension less than in the case of a complete transformation. Thus, for line detection, a one-dimensional space is given. Even at that moment, the same is examined for maxima. When a maximum is present, not only the corresponding coordinates are included, but the points belonging to the object are eliminated from the number of image points to be transformed. Thus, it is prevented that an element once recognized as an object point contributes to other portions of the Hough space. The method is repeated as long as the image set still contains elements. One problem of this analysis is the analysis at extreme locations in the transformed, since the one-dimensional parameter spaces are observed separately. A concrete threshold value for the maxima is hard to predict, the more so since the objects generally vary in size.

In SHPILMAN, IL and V. URAILOVSKY: Fast and Robust Techniques for Detecting Straight Line Segments Using Locals Models. Pattern Recognition Letters, 20:865-877, 1999, Sphilman et al. describe a method for detecting straight lines, wherein existing knowledge about partial points of the objects to be detected is used. Herein, one-dimensional parameter spaces are employed. The image to be analyzed is pre-processed by an edge filter, so that, from the outset, the algorithm includes only points lying on lines. For each of these points $p_k$, a one-dimensional histogram is generated that indicates the angle under which as many of the remaining points $q_k$ form a line with p. This method produces errors, if the pre-processing leaves too many points that are not located on lines. Another drawback mentioned by the authors is that such points as are in the vicinity of p can not be included in the analysis; the transformation algorithm is based on the determination of the intersection of the line $pq_k$ and a fixed reference line and will lead to distortions should the distance of p and $q_k$ is too short. Moreover, there still is a possibility of erroneously detected lines (see FIG. 9(b) in Shpilman, above).

In the field of biology, Hough transformation was already employed by Lyazghi et al (LYAZGHI, A., C. DECAESTEKER, I. CAMBY, R. KISS and P. V. HAM: Characterisation of Actin Filaments in Cancer Cells by the Hough Transform. In: Signal Processing, Pattern Recognition and Applications, p. 138-142. IASTED, July 2001.) for detecting filaments within the cell skeleton of cancer cells. In this method, initially false maxima are also allowed in the (integral) transformation of the cell surface. The extreme locations are verified only after a post-treatment. Here, the authors compare the length of the corresponding line with the lengths to be expected, the cell diameter serving as the maximum dimension.

SUMMARY

A method for detecting geometrical structures in images, which allows to detect the geometrical structures with high reliability.

With the present method, geometrical structures in images are detected. These are specifically images of chemical and/or biological samples and, particularly preferred, images of cells, cell organelles and/or cell cores. After capturing an image, in particular a digital image, using conventional imaging methods, as employed preferably in fluorescence spectroscopy, a boundary line of an imaged object is detected. In particular, a plurality of imaged objects is detected by means of the individual boundary lines. For example, this may be achieved by a threshold value method and corresponding calculation operations. Thereafter, a sector is defined within the image. According to the invention, the sector is not randomly selected, but a sector is defined whose sector origin lies on the boundary line detected before. Here, the sector especially has a circular shape or the shape of a segment of a circle. A sector in the shape of a segment of a circle preferably extends outward in a funnel-shape from a sector origin on the boundary line, the origin preferably being the center of the circle. Subsequently, the image section defined by the sector is transformed to a transformation space. Here, a transformation is employed by which the geometrical structures present in the image section, especially cell traces, respectively correspond to signatures in the transformation space. In particular, the signatures are maxima in the transformation space.

It is then determined within the transformation space, whether one or several signatures are present. Thereafter, the signatures determined are retransformed from the transformation space so that the geometrical structure is represented in the corresponding sector.

It is a particular advantage of the method that a sector is transformed that is unambiguously defined as to its position, the sector space being defined specifically by the origin of the sector that lies on the boundary line of the object.

Preferably, the transformation is performed using a linear, circular or generalized Hough transformation.

Preferably, the transformation is such that the spatial structures of the image sector are associated with signatures in the transformation space that have a fixed spatial relationship with the origin of the sector, especially intersect the origin of the sector, or whose linear projection substantially passes through the origin of the sector.

It is particularly preferred for the defined sector to have an axis of symmetry, the axis of symmetry being oriented substantially perpendicular to the boundary line.

It is particularly preferred that the sector extends outward starting from the boundary line of the object. The image section preferably is an intersection of the sector and a zone extending along the boundary line, in particular outside the boundary line. In the context of the detection of cell traces, this zone is particularly referred to as fiber space.

Preferably, the sectors are analyzed, in particular commonly, with consideration to the sequence of their respective sector origins on the boundary line.

The sequence of the contour pixels to be analyzed can be calculated with the following classic algorithm.

From the contour, whose elements are all connected in proximities of 4 and 8, a pixel p with a minimum x coordinate is selected. Then, the proximities of p are observed in a clockwise direction and it is checked whether the respective point lies on the contour. In this event, the point is defined as a first element of the sequence to be determined and is removed from the set of contour pixels.

Then, the examination of the proximities is repeated at the respective last observed pixel until the contour set is empty and p is reached again. The respective pixels removed from the contour are joined to the sequence. At the end of the process, this defines the sequence in which the local image parts to be transformed are to be determined.

DETAILED DESCRIPTION OF THE PREFERRED EMBODIMENT

The image to be analyzed for cell traces is first pre-processed by marking the relevant portions. In a typical picture of the cells described in ZIMMERMANN, H., E. RICHTER, C. REICHLE, L WESTPHAL, P. GEGGIER, U. REHN, S. ROGASCHEWSKI, W. BLEISS and G. R. FUHR: *Mammalian Cell Traces-Morphology, Molecular Composition, Artificial Guidance and Biotechnological Relevance as a New Type of "Bionanotube"*, Appl. Phys. A., May 2001, the grey values of the cell bodies are in the light part of the scale and are clearly distinct from the dark background. The vicinity points of the cells lie therebetween on the scale and may be marked with global threshold values by a simple segmentation. The marking itself should subsequently be available in the form of a binary mask in which the portions associated with the individual cells, i.e. the fiber spaces, can be distinguished from each other. The cell bodies themselves are not included in these portions, so that each fiber space has an outer and an inner boundary line.

For each point $p_k$ (FIG. 1) on the inner contour, i.e. the boundary line of the cell, a circular sector is calculated, having a center $p_k$ and projecting from the boundary line into the fiber space such that the tangent line of the contour to $p_k$ forms a right angle with the direction vector r of the sector. The included angle of the sector is defined by 2 $\phi$, where a fiber projecting from the contour may have a maximum variation of $\phi$ from a right angle. The detection may also be restricted to such fibers that can only deviate by $\phi$ in one direction, but may deviate by a second tolerance angle $\rho$ in the other direction. In this case, the included angle shall be $\phi+\rho$. The circular sector is caused to intersect with the fiber space. Here, the length of r must be such that all points on the circular line are separated.

Figure 1:
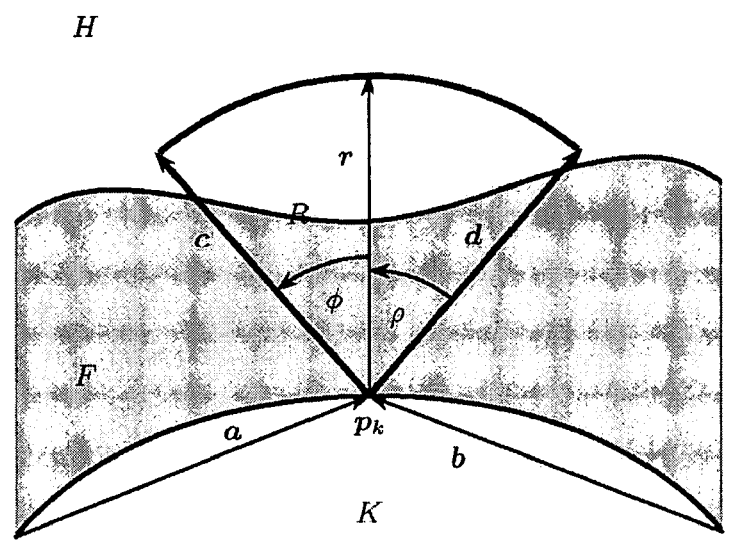
FIG. 1 is a schematic sketch of an imaged object in the form of a cell for the purpose of explaining the present method.

Referring to FIG. 1, an embodiment for the detection of cell traces will be explained. In doing so, first, the calculation of the sectors to be transformed will be explained.

The labeling in FIG. 1 may be characterized as follows: a, b, c, d, f, $p_k$ and r are vectors; F, H, R and K refer to sets of vectors; $\lambda_1$, and $\lambda_2$ are scalar values. <a,b> refers to the scalar product of the vectors a and b; $\rho$ and $\phi$ are angles; |r| refers to the Euclidian length of r; and $(-a_y, -a_x)^T$ refers to a transposed vector for whose components the x and y parts of the vector a are used.

The following is a more detailed description of the calculation of image portions to be transformed.

FIG. 1 shows a circular sector R with the center $p_k$ on the boundary line of a cell K. The orientation of the cell is indicated by a vector r and the angles $\rho$ and $\phi$. The sector intersects the fiber space F and the background H. The local orientation of the sector with respect to the circular line can be unambiguously determined in a continuous space by means of the local tangent gradient. However, when the cell contour is a chain of points in a discrete grid, the orientation can only be approximated. This problem was shown, for example, by Utcke [Utcke, S.: Error-Bounds on Curvature Estimation, in: Griffin, L. and M. Lillholm (ed.): Scale-Space 2003, p. 657-665. Springer-Verlag 2003].

A known method for calculating local gradients in a discrete space is the use of an isosceles triangle that is moved along the contour line to be analyzed. The commensurate legs are indicated by the vectors a and b in FIG. 1. Their end points lie on the contour line and their common end point $p_k$ identifies the point on the contour to be analyzed. The lengths of a and b are optional but fixed and must be determined as a function of the noise level of the contour. A length too great or too small will result in an inaccurate determination of the orientation.

The accuracy of these local calculations may be enhanced by a prior smoothing of the contour. A contour with a high noise level causes a great deviation in the orientation of successive circular sectors. A smooth contour is advantageous for a later correlation (maximum analysis) of the transformed. Suitable for smoothing is the algorithm of Mokhtarian

[Mokhtarian, F. and A. K. Mackworth: A Theory of Multiscale, Curvature-Based Shape Representation for Planar Curves. IEEE Transactions on Pattern Analysis and Machine Intelligence, 14(8), August 1992].

If the sector orientation is to be exactly at a right angle with the local tangent through $p_k$, it may be approximated by the sum r=a+b. If <a,b><0 is true, the contour line at $p_k$ is concave; r should then be inverted so that it does not point to the interior of the object. If <a,b>=0 is true, the contour line at $p_k$ is straight and r can be determined as a vector standing perpendicularly on a, e.g., by $(-a_y, -a_x)_T$. In the latter case, the correct direction with respect to the object has to be verified in another way. r is made to assume the length of the smallest cell diameter and it is examined, whether the pixel determined by the vector lies inside or outside the cell. The vector is inverted should it lie inside the cell.

The optimum choice for the length of r depends on various parameters. When the maximum length of the fibers to be detected is known, this value represents the optimum choice. Generally, it has to be taken into account, however, that a too short a length results in a circular sector that does not fully cover the fiber space at the selected location $p_k$; thereby, significant intensities in this portion may possibly not be transformed. This effect is amplified especially for large opening angles $\phi$ and $\rho$. With smaller angles and a mainly rectangular orientation of the fibers, the Hausdorff distance is proposed for |r| [Huttenlocher, D. P., G. A. Klanderman and W. J. Rucklidge: Comparing Images Using the Hausdorff Distance. IEEE Transactions on Patern Analysis and Ma—sin chine Intelligence, 15(9): 850-863, September 1993]: Here, for each contour point $p_k$, the nearest point on the outer boundary of the fiber space is calculated. Among the distances thus calculated, the greatest is chosen. Scaling r to this length, it is guaranteed that r, when oriented rectangularly, will point beyond the fiber space in any case.

Multiplying r by the rotation matrices $$\begin{pmatrix} \cos\phi & -\sin\phi \\ \sin\phi & \cos\phi \end{pmatrix}$$

or, respectively, $$\begin{pmatrix} \cos\rho & -\sin\rho \\ \sin\rho & \cos\rho \end{pmatrix}$$

the vectors c and d, respectively, are obtained, which span the circular sector R. It should be noted that $\rho$ is to be indicated relative to r in the second rotation matrix, whereby it is generally negative.

Subsequently, using c and d, all points $f \in F$ located in the fiber space are systematically examined to determine whether they are to be part of the region to be transformed. f is accepted exactly when the parameters $\lambda_1$ and $\lambda_2$ exist so that $\lambda_1 c + \lambda_2 d = f$.

The image section lying under the circular sector is subjected to a linear Hough transformation with respect to $p_k$, so that a one-dimensional Hough space is formed. The space has a fixed height of $2\phi$ or $\phi+\rho$, respectively.

The calculation of a circular sector, as well as the transformation are performed for each point $p_k$ on the inner boundary of the fiber space. In doing so, the order of the points on the contour should be observed.

The calculated one-dimensional parameter spaces will now be combined to form a superordinate space, whose first dimension are the pixels of the cell contour. The second dimension describes the opening angle. In synthesizing the space, the individual Hough spaces are strung together according to the sequence of their calculation.

The space formed is examined for maxima. Each maximum position found indicates the line parameters $\theta$ and p; the corresponding line passes through the edge point $p_m$ under an angle $\theta_m$.

The advantage of the present method over prior art is that it not only employs a local model, but also correlates the calculated local parameter spaces. Looking at two adjacent one-dimensional parameter spaces, a maximum $(p_m/\theta_m)$ in the first space will very likely correspond to an actually present line, even if the neighboring space also includes high values.

The method takes advantage of the fact that the potential origins of the fiber lines can be determined a priori so that the transformation can thereby be limited. The intensities of a given fiber will in part occur during the transformation in a plurality of subsequent parameter spaces. All intensities of the fiber will, however, only appear in the sector through whose origin the fiber passes. Thus, a maximum is created only in the corresponding parameter space.

Referring to FIGS. 2a-2e, the invention will be explained in more detail with respect to an embodiment thereof.

Figure 2A:
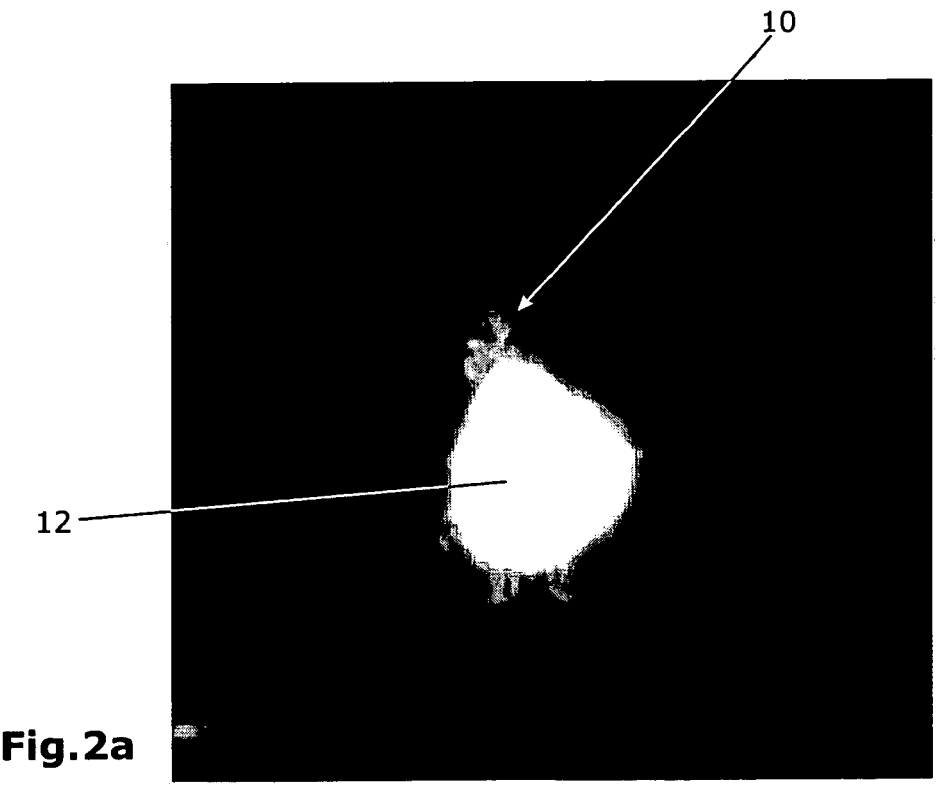
FIGS. 2a-2e are representations of a cell with cell traces thereon, showing individual stages of the present method.
Figure 2B:
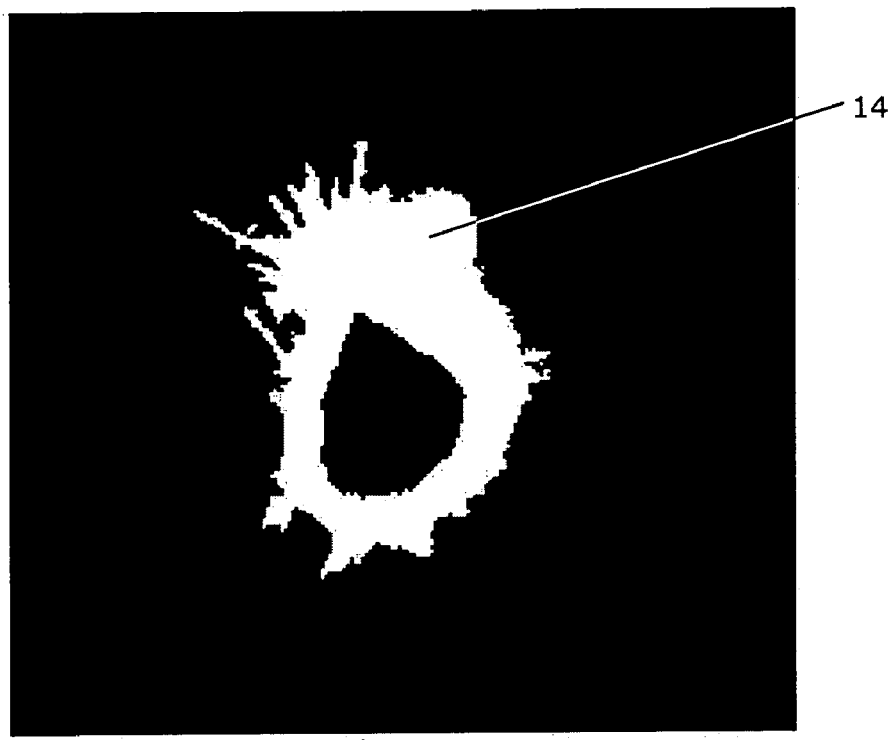

The image of a cell 12 with fibers 10 or cell traces thereon (FIG. 2a) is to be analyzed. The image is subjected to a global threshold value analysis to determine the space in which the fibers can be located. Two threshold values are set such that one of the two delimits the backgrounds over fiber space intensities and the second delimits the fiber intensities over the cell body. Applying these values, a respective binary image is obtained that contains the fiber space with the cell body or the cell body alone, respectively. Subtracting both images provides the fiber space 14 as illustrated in FIG. 2a.

Figure 2C:
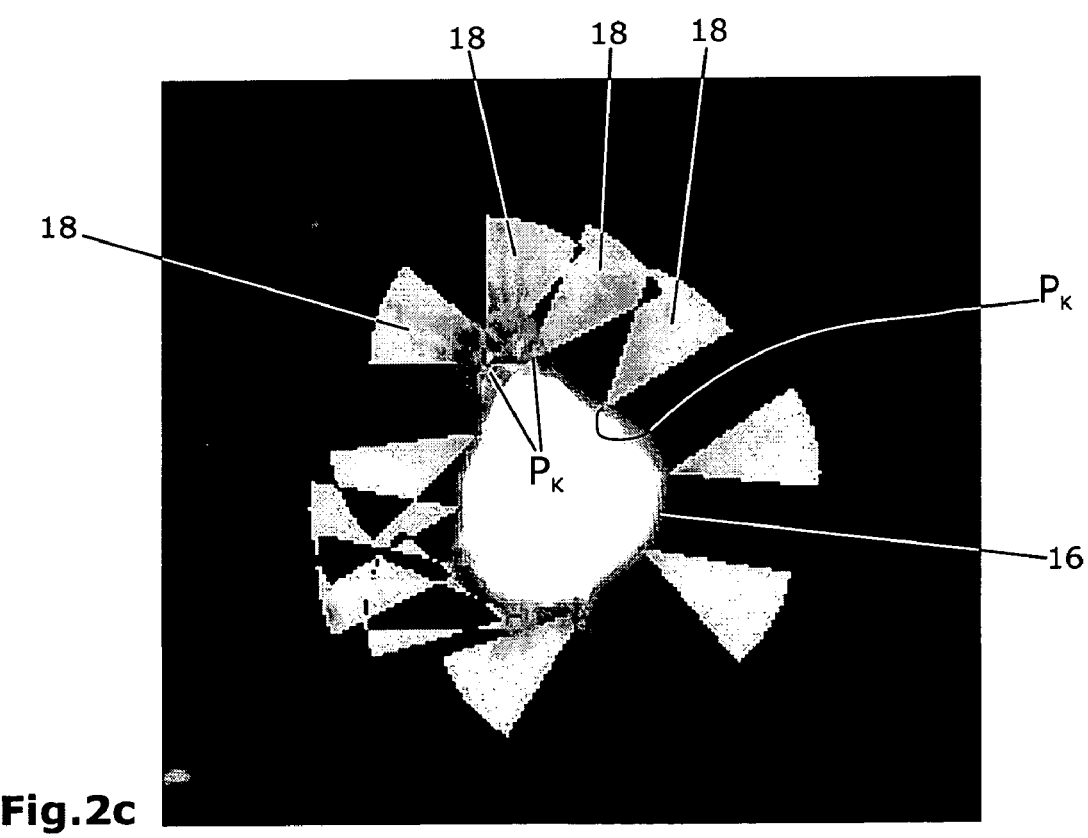

Now, a circular sector is calculated for each point $p_k$ on the inner boundary line 16 of the fiber space, so as to limit the subsequent transformation locally. FIG. 2c shows a selection of the determined sectors 18. Their opening angle represents the range of inclination in which fibers are to be looked for.

Figure 2D:

After making the sectors intersect the fiber space, the transformation is performed. FIG. 2d illustrates the one-dimensional parameter spaces after their combination. On the horizontal axis, the coordinate system indicates the index k of the respective space 18; the vertical axis indicates the angle. Black areas mark that section of the sectors 18 that are not transformed because of their limited opening angle.

Figure 2E:
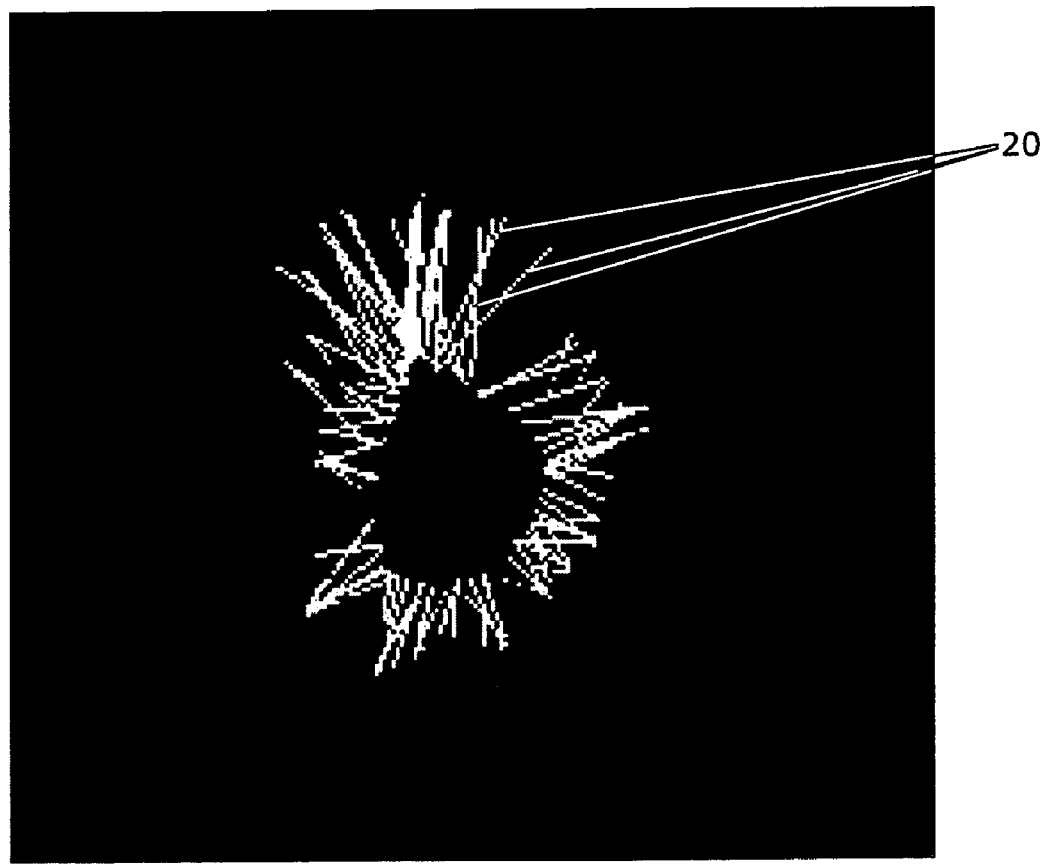

The indicated combined space is subjected to an analysis for maxima. Retransformation of these extreme points yields lines 20 that extend correspondent to the actually existing fibers or cell traces. In the example, the retransformation has been restricted to the previously determined fiber space (FIG. 2e).

What is claimed is:

1. A method for detecting geometrical structures in images, especially in images of chemical and/or biological samples, such as images of cells, said method comprising the following steps:
   detecting a boundary line of the image object;
   defining at least one sector inside the image, the origin $(p_k)$ of which lies on the boundary line;
   transforming the image section defined by the sector into a transformation space by means of a transformation that associates signatures in the transformation space with respective geometrical structures in the image section;

determining the presence of at least one signature inside the transformation space; and retransforming said signatures from the transformation space into the sector for the representation of the geometrical structure, wherein said geometrical structures are linear structures, and wherein the transformation associates a signature in the transformation space in particular to such linear structures present in the image section that pass substantially through the origin of the sector or whose linear projection substantially passes through the origin of the sector.

2. The method of claim 1, wherein the origin ($p_k$) of the sector lies on an edge of the sector or within or outside of the sector.

3. The method of claim 1, wherein the transformation includes a linear, circular or generalized Hough transformation.

4. The method of claim 1, wherein the transformation associates a signature in the transformation space in particular to such spatial structures present in the image section that are in a fixed spatial relationship with the origin of the sector.

5. The method of claim 1, wherein the boundary line is determined by forming threshold values.

6. The method of claim 1, wherein the sector is a circle or a segment of a circle.

7. The method of claim 6, wherein the origin of the sector is the centre of the circle.

8. The method of claim 1, wherein the sector has at least one axis of symmetry, and the axis of symmetry is oriented substantially perpendicular to the boundary line.

9. The method of claim 1, wherein the image section corresponding to the sector is the intersection of the sector and a zone extending along the boundary line.

10. The method of claim 1, wherein a majority of sectors is defined and analyzed.

11. The method of claim 1, wherein a majority of sectors are analyzed in common.

12. The method of claim 11, wherein the sectors are analyzed in common with consideration to the sequence of their respective sector origins on the boundary line.

13. The method of claim 12, wherein correlations between the transformation spaces are analyzed.

14. The method of claim 1, wherein the boundary line is the outer boundary of a cell, the boundary of a cell organelle and/or the boundary of a cell core.

* * * * *